UNITED STATES PATENT OFFICE.

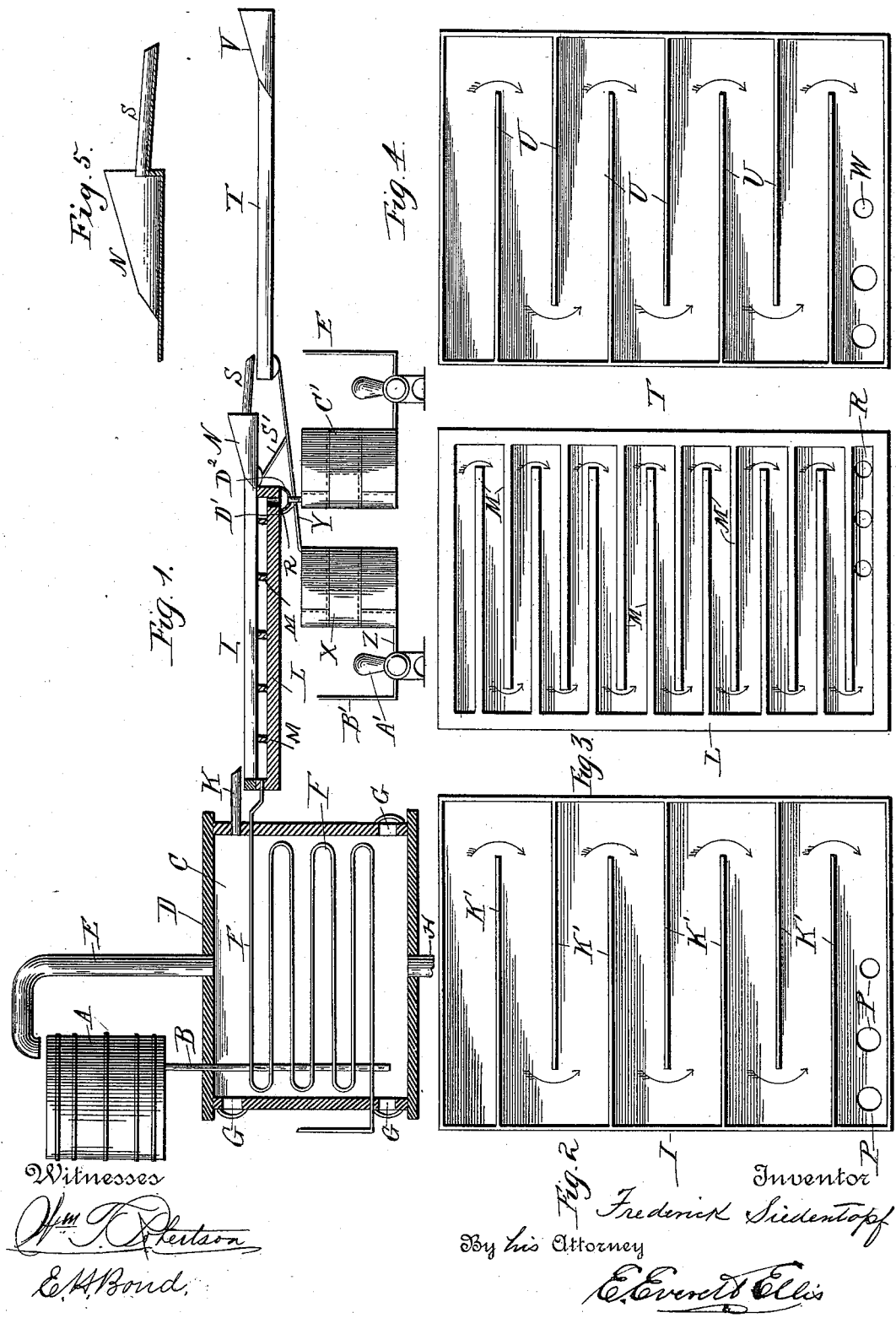

FREDERICK SIEDENTOPF, OF TERRE HAUTE, INDIANA, ASSIGNOR OF ONE-HALF TO JOSEPH H. BRIGGS, JAMES N. PHILLIPS, ANDREW GRIMES, JUDSON Q. BUTTON, JAMES B. REYNOLDS, JOHN F. GULICK, AND J. C. HARPER, OF SAME PLACE.

APPARATUS FOR MAKING SALT.

SPECIFICATION forming part of Letters Patent No. 418,761, dated January 7, 1890.

Application filed July 31, 1889. Serial No. 319,315. (No model.)

*To all whom it may concern:*

Be it known that I, FREDERICK SIEDENTOPF, a citizen of the United States, residing at Terre Haute, in the county of Vigo and State of Indiana, have invented certain new and useful Improvements in Apparatus for Making Salt; and I do hereby declare the following to be a full, clear, and exact description of the invention, such as will enable others skilled in the art to which it appertains to make and use the same.

This invention relates to certain new and useful improvements in apparatus for the manufacture of salt; and it consists, substantially, in such features of arrangement, construction, and combinations of parts, as will hereinafter be more particularly described, and pointed out in the claims.

The above-mentioned objects are effected by the means illustrated in the accompanying drawings, in which—

Figure 1 represents a view, partly in section and partly in side elevation, of my improved apparatus complete. Fig. 2 represents a top view of an evaporating and settling pan forming part of my apparatus. Fig. 3 represents a steam heating-pan, which is located below the pan and settler above mentioned in the complete apparatus; and Fig. 4 represents a top view of a settling-pan, in which the salt from the partially-cooled brine may settle. Fig. 5 represents a longitudinal sectional view of one of the overflows located at the rear ends of the respective pans.

Referring to the drawings, the letter A indicates a reservoir containing the brine to be treated. The said reservoir has extending from its bottom a pipe B, which passes down into a boiler or heater C, in which the brine is heated. The boiler or heater is provided with a cover D, from which extends upward a goose-neck pipe E, which terminates over the reservoir A, so as to discharge any overflow from the boiler C and act as a safety-vent therefor.

The letter F indicates a coil of pipe located within the boiler and passing out of the same near the top and bottom thereof, the lower end of said pipe being connected with a steam-boiler and the upper end with the steam heating-pan, to be hereinafter described. The boiler is provided with covered man-holes G, to permit access for cleaning, and with a discharge-pipe H for the spent brine.

The letter I indicates an evaporating and settling pan located near the boiler, and K a short pipe leading from the boiler to the said pan at one end. The pan is constructed, preferably, of metal, with a series of partitions K', extending alternately from one side to near the other of the pan to force the brine to take a tortuous course through it.

L indicates the steam heating-pan before mentioned. This consists of a rectangular casing having a series of partitions M, extending alternately from opposite sides, as shown in Fig. 3 of the drawings. The heating-pan sets under the pan I before mentioned and serves to heat the same. The rear end of the pan I is provided with an overflow N, and with apertures P in its bottom, communicating with the steam heating-pan L, and said pan L is provided at its rear with similar openings R, connecting with a suitable conduit $D^2$, leading to a feed-water tank by means of pipe D', as more fully hereinafter described.

From the overflow N extends a conduit S to one end of a cold settling-pan T, located at the rear of the evaporating and settling pan. This pan is constructed similarly to said evaporating-pan, with partitions U extending alternately from opposite sides, and with an overflow V and discharge-passages W at its rear end.

The letter X indicates a tank, which connects with the discharge-openings of the settlers by means of the pipes S' Y, the said tank being designed to receive the spent brine for further use. The said tank has a pipe Z, leading from its lower part to a pump A', from which extends a pipe B' to the tank A, whereby the spent brine may be pumped back to the said tank to be reheated.

C' indicates a feed-water tank, which is connected with the discharge-openings of the steam-pan L by means of a pipe D', and from which extends a feed-pipe E to the steam-boiler employed for heating the apparatus.

The operation of my invention is as follows: The brine is allowed to flow from the reservoir A through pipe B into the boiler or heater C, where it is heated through the medium of the heat furnished by the steam-coil. The hot brine from the boiler passes into the evaporating and settling pan and the steam from the coil into the pan L, below said pan. The brine in passing through the pan deposits the salt in fine crystals on the bottom thereof, and the reduced brine passes on to the settling-pan, where a further deposition in larger crystals takes place. The spent brine from either or both of the settling-pans may be returned through the pipes to the tank to be used over again, as before mentioned. The condensed steam passes to the tank to heat the feed-water for the boiler.

It is evident that the apparatus may be modified without departing from the spirit of my invention. For instance, the boiler or heater instead of being inclosed may be open, and the overflow regulated by means of floats and valves or other devices, or the process may be carried out in any other apparatus adapted to the purpose; but I prefer the apparatus substantially as herein shown and described.

Having thus fully described my invention, what I claim, and desire to secure by Letters Patent, is—

1. In an apparatus for the manufacture of salt, the combination, with a boiler, a reservoir connected therewith, a goose-neck communicating with said boiler and reservoir, a steam-coil located in said boiler, a heating-pan having transverse partitions and openings in its bottom and connected with one end of said steam-coil, and an evaporating-pan located above the heating-pan, connected with the boiler and having transverse partitions and openings in one end, substantially as described.

2. In an apparatus for the manufacture of salt, the combination, with a reservoir, a boiler, and a steam-coil therein, of a heating-pan connected with the steam-coil, an evaporating-pan located above the heating-pan and connected with the boiler, and a settling-pan connected with the evaporating-pan, all of said pans being provided with transverse partitions and openings in their bottoms, substantially as described.

3. In an apparatus for the manufacture of salt, the combination, with a reservoir, a boiler, and a steam-coil therein, of a heating-pan connected with the steam-coil, having transverse partitions and openings in its bottom, an evaporating-pan located above said heating-pan and communicating with the boiler, a feed-water tank, a conduit connected with the heating-pan, and a pipe connecting the conduit and feed-water tank, substantially as described.

4. In an apparatus for the manufacture of salt, the combination, with boiler C, reservoir A, steam-coil F, heating and evaporating pans L I, having transverse partitions M K', and openings R P, and connected, respectively, with the steam-coil and the boiler, of the settling-pan T, having partitions U and holes W, and connected with the evaporating-pan I by overflow N and pipe S, substantially as described.

5. In an apparatus for the manufacture of salt, the combination, with reservoir A, boiler C, steam-coil F, heating and evaporating pans L I, connected, respectively, with said coil and boiler, of the settling-pan T, overflow N, pipe S, conducting-pipes S' Y, and tank X, substantially as described.

6. In an apparatus for the manufacture of salt, the combination, with reservoir A, boiler C, steam-coil F, heating and evaporating pans L I, connected, respectively, with said coil and boiler, of the settling-pan T, overflow N, pipe S, conduit $D^2$, pipe D', pipes S' Y, and tanks C' X, substantially as described.

7. The combination, in an apparatus for the manufacture of salt, of a reservoir, a boiler connected therewith, a steam-coil connected with a steam-boiler, an evaporating-pan and settler connected with the boiler or heater, a steam heating-pan located under said pan and connected with the steam-coil, and the spent brine and feed-water tanks and their connecting pipes, the whole arranged to operate substantially as and for the purposes described.

In testimony whereof I affix my signature in presence of two witnesses.

FREDERICK SIEDENTOPF.

Witnesses:
J. B. REYNOLDS,
THOS. J. ANDERSON.